United States Patent [19]
Hornung et al.

[11] Patent Number: 6,052,761
[45] Date of Patent: *Apr. 18, 2000

[54] INCREMENT UPDATE IN AN SCI BASED SYSTEM

[75] Inventors: Bryan Hornung, Plano; Bryan Marietta, Austin, both of Tex.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/792,310

[22] Filed: Jan. 31, 1997

[51] Int. Cl.⁷ ...................................................... G06F 12/00
[52] U.S. Cl. ............................. 711/141; 711/118; 711/148
[58] Field of Search ..................................... 711/117, 118, 711/123, 109, 150, 154, 141, 147–148; 395/800.12, 800.29; 712/225

[56] References Cited

U.S. PATENT DOCUMENTS

| | | | |
|---|---|---|---|
| 4,562,539 | 12/1985 | Vince | 364/200 |
| 4,677,614 | 6/1987 | Circo | 370/86 |
| 5,197,146 | 3/1993 | LaFetra | 711/144 |
| 5,265,103 | 11/1993 | Brightwell | 371/32 |
| 5,455,865 | 10/1995 | Perlman | 380/49 |
| 5,535,365 | 7/1996 | Barriuso et al. | 711/167 |
| 5,560,027 | 9/1996 | Watson et al. | 395/800 |
| 5,590,284 | 12/1996 | Crosetto | 395/200.5 |
| 5,765,035 | 6/1998 | Tran | 395/392 |
| 5,802,322 | 9/1998 | Niblett | 709/251 |
| 5,900,020 | 5/1999 | Safranek et al. | 711/167 |

*Primary Examiner*—John W. Cabeca
*Assistant Examiner*—Pierre-Michel Bataille

[57] ABSTRACT

The system and method for performing an update operation on the sharing list in a multi-node SCI-based system involves issuing an update command from a first node in the list to the remaining nodes in the sharing list, however the first node maintains its position at a head position in the sharing list. The first node issues an increment command to each successive node in the list until the end of the list is reached. Each node receives the increment command and updates its cache and then sends a reply back to the first node, listing the state of the node and a pointer to the next node. The method and system also prevents a node from rolling out of the sharing list before that node receives the update command. Each node has a phase value that is toggled as the node is incremented. Thus, a rollout request will be nullified unless the phase value of the rollout request matches the phase value of the node. The system and method also interlocks the rollout requests to inhibit a node that is being rolled out from being incremented.

28 Claims, 17 Drawing Sheets

1  NODE 0 VALID_INVALID TO NODE 1
2  NODE 0 VALID_INVALID TO NODE 2
3  NODE 1 MREAD TO MEMORY
4  NODE 2 MREAD TO MEMORY

5  NODE 1 CREAD TO NODE 0
6  NODE 2 CREAD TO NODE 1

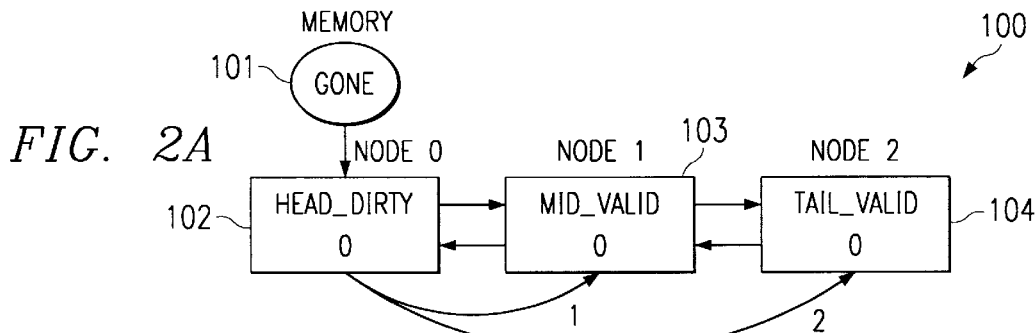

FIG. 2A

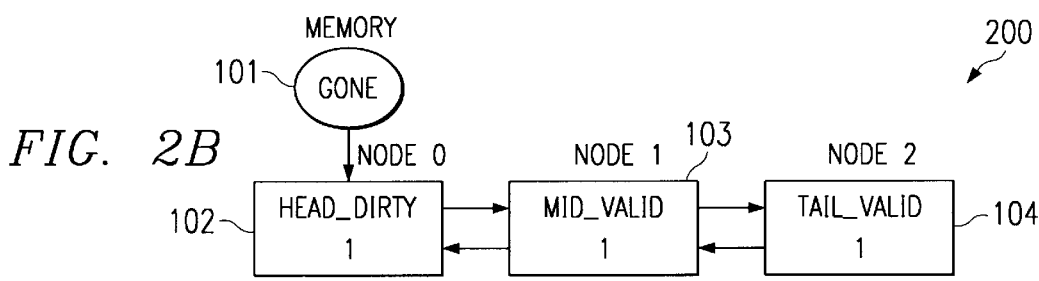

FIG. 2B

```
// increment_update eri_table initialization state machine
// turn the current stable state into first transitory
// state
switch (cstate) {
case ERI_CS_INVALID:
    eri_write(CS_PENDING,NULL,NULL) ;
    break;
case CS_ONLY_FRESH:
    eri_write(CS_OF_MODS_OD,NULL,NULL) ;
    break;
case CS_HEAD_FRESH:
    eri_write(CS_HF_MODS_HD_forw,NULL) ;
    break;
case CS_MID_VALID:
    eri_write(CS_MV_forw_MV,forw,back) ;
    break;
case CS_TAIL_VALID:
    eri_write(CI_TV_back_PEND,NULL,back) ;
    break;
case CS_HEAD_DIRTY:
    eri_write(CI_HD_UPDATE_HD,forw,NULL) ;
    break;
default:
// should be able to handle everything else locally
    error() ;
    break;
}
```

```
// inc_update request state machine
switch (cstate) {
case CS_PENDING:
        eri_request(MREAD,MC_CACHE_DIRTY,mem_addr) ;
        break;
case CS_QUEUED_DIRTY:
        eri_request(CUPDATE,CC_PEND_VALID,forw) ;
        break;
case CS_QUEUED_JUNK:
        eri_request(CREAD,forw) ;
        break;
case CI_HD_UPDATE_HD:
        eri_request(CINC,forw) ;
        break;
case CS_OF_MODS_OD:
case CS_HF_MODS_HD:
        eri_request(MUPDATE,MC_LIST_TO_GONE,mem_addr) ;
        break;
case CS_HX_retn_IN:
        eri_request(MUPDATE,MC_PASS_HEAD,mem_addr) ;
        break;
case CI_OF_retn_PEND:
        eri_request(MUPDATE,MC_LIST_TO_HOME,mem_addr) ;
        break;
case CS_TV_back_IN:
case CI_TV_back_PEND:
        eri_request(CUPDATE,CC_PREV_VTAIL,back) ;
        break;
case CS_MV_back_IN:
        eri_request(CUPDATE,CC_PREV_VMID,back) ;
        break;
case CS_MV_forw_MV:
        eri_request(CUPDATE,CC_NEXT_VMID,forw) ;
        break;
case CI_HF_FORW_HX:
        eri_request(CUPDATE,CC_NEXT_FHEAD,forw) ;
        break;
}
```

FIG. 5A

```
// use the current state of the cache line in the table and the incoming
// request to determine the new cache state. Nullify anything not listed
// in the statements below.

switch (cstate)
case CS_MV_back_IN:
        switch (req_in)
        case CPURGE:
                switch (flow)
                case ROLLOUT:
                        next_cstate = CS_TO_INVALID;
                        break;
                default:
                        next_cstate = CI_TO_PENDING;
                        break;
                nullify = FALSE;
                break;
        case CINC:
                toggle_sphase = rollout_phase == NORMAL;
                cinc_nullify = rollout_phase == NORMAL ||
                                rollout_phase == WAIT_RESP;
                nullify = FALSE;
                switch (rollout_phase)
                case NORMAL:
                        next_rollout_phase = WAIT_RESP;
                        break;
                case WAIT_RESP:
                        next_rollout_phase = WAIT_RESP;
                        break
                case CORR_PHS:
                        next_rollout_phase = NORMAL;
                        break;
                case CORR_PHS_DONE:
                        next_rollout_phase = NORMAL;
                        switch (flow)
                        case ROLLOUT:
                                next_cstate = CS_TO_INVALID;
                                break;
                        default:
                                next_cstate = CI_TO_PENDING;
                                break;
                        break;
                break;
        break;
case CS_MV_forw_MV:
        switch (req_in)
        case CPURGE:
                switch (flow)
```

FIG. 5B

```
            case ROLLOUT:
                    next_cstate = CS_TO_INVALID;
                    break;
            default:
                    next_cstate = CI_TO_PENDING;
                    break;
            nullify = FALSE;
            break;
        case CUPDATE, PREV_VMID:
            if (req_from_cforw && shared_phase_eql)
                    // no state change, but change forw ptr to passed ptr
                    next_cstate = cstate;
                    next_forw = req_ptr;
                    nullify = FALSE;
            break;
        case CUPDATE, PREV_VTAIL:
            if (req_from_cforw && shared_phase_eql)
                    switch (flow)
                    case ROLLOUT:
                        next_cstate = CI_TO_TV_back_IN;
                        break;
                    default:
                        next_cstate = CI_TO_TV_back_PEND;
                        break;
                    nullify = FALSE;
            break;
        break;
    case CS_OD_spin_IN:
            switch (req_in)
            case CUPDATE, PEND_VALID:
            case CREAD:
                    next_cstate = CS_TO_TV_back_IN;
                    break;
        case CPURGE, VALID_INVALID:
            next_cstate = CS_TO_INVALID;
            break;
    nullify = FALSE;
    break;
case CS_HF_MODS_HD:
        switch (req_in)
        case CUPDATE, PREV_VMID:
            if (req_from_cforw && shared_phase_eql)
                    // no state change, but change forw ptr to passed ptr
                    // change back ptr to passed ptr in case this in inc
                    next_forw = req_ptr;
                    next_back = req_ptr;
                    nullify = FALSE;
            break;
```

FIG. 5C

```
            case CUPDATE, PREV_VTAIL:
                    if (req_from_cforw && shared_phase_eql)
                        next_cstate = CS_OF_MODS_OD;
                    // change forw ptr to passed ptr
                    // change back ptr to passed ptr in case this in inc
                    next_forw = req_ptr;
                    next_back = req_ptr;
                    nullify = FALSE;
                break;
            break;
        case CS_OF_retn_IN:
            switch (req_in)
            case CUPDATE, PEND_VALID:
            case CREAD:
                    next_cstate = CS_TO_TV_back_IN;
                    break;
            case CPURGE, FRESH_INVALID:
                    next_cstate = CS_TO_INVALID;
                    break;
            nullify = FALSE;
            break;
        case CS_TV_back_IN:
            switch (req_in)
            case CPURGE, VALID_INVALID:
                    next_cstate = CS_TO_INVALID;
                    nullify = FALSE;
                    break;
            case CINC:
                    toggle_sphase = rollout_phase == NORMAL;
                    cinc_nullify = rollout_phase == NORMAL ||
                                    rollout_phase == WAIT_RESP;
                    switch (rollout_phase)
            case NORMAL:
                    next_rollout_phase = WAIT_RESP;
                    break;
            case WAIT_RESP:
                    next_rollout_phase = WAIT_RESP;
                    break
            case CORR_PHS:
                    next_rollout_phase = NORMAL;
                    break;
            case CORR_PHS_DONE:
                    next_rollout_phase = NORMAL;
                    next_cstate = CS_TO_INVALID;
                    break;
            nullify = FALSE;
            break;
        break;
```

FIG. 5D

```
case CI_HF_FORW_HX:
    switch (req_in)
    case CUPDATE, PREV_VMID:
            if (req_from_cforw && shared_phase_eql)
                // no state change, but change forw ptr to passed ptr
                next_cforw = req_ptr;
            nullify = FALSE;
            break;
    case CUPDATE, PREV_VTAIL:
            if (req_from_cforw && shared_phase_eql)
                        next_cstate = CI_HF_FORW_OF;
                        next_cforw = req_ptr;
            nullify = FALSE;
            break;
    break;
case CI_HD_FORW_HX:
    switch (req_in)
    case CUPDATE, PREV_VMID:
            if (req_from_cforw && shared_phase_eql)
                // no state change, but change forw ptr to passed ptr
                next_cforw = req_ptr;
            nullify = FALSE;
            break;
    case CUPDATE, PREV_VTAIL:
            if (req_from_cforw && shared_phase_eql)
                next_cstate = CI_HD_FORW_OD;
                next_cforw = req_ptr;
            nullify = FALSE;
            break;
    break;
case CS_HX_retn_IN:
    switch (req_in)
    case CUPDATE, PEND_VALID:
    case CREAD:
    case CPURGE, FRESH_INVALID:
    case CPURGE, VALID_INVALID:
            switch (flow)
            RD_PRIV:
            WR_UPDATE:
            WR_PURGE:
                next_cstate = CI_TO_PENDING;
                break;
            default:
                next_cstate = CI_TO_INVALID;
                break;
            nullify = FALSE;
            break;
    break;
```

FIG. 5E

```
case Cl_TV_back_PEND:
        switch (req_in)
        case CPURGE, VALID_INVALID:
                next_cstate= Cl_TO_PENDING;
                nullify = FALSE;
                break;
        case CINC:
                toggle_sphase = rollout_phase == NORMAL;
                nullify = FALSE;
                cinc_nullify = rollout_phase == NORMAL ||
                                    rollout_phase == WAIT_RESP;
                switch (rollout_phase)
                case NORMAL:
                        next_rollout_phase = WAIT_RESP;
                        break;
                case WAIT_RESP:
                        next_rollout_phase = WAIT_RESP;
                        break
                case CORR_PHS:
                        next_rollout_phase = NORMAL;
                        break;
                case CORR_PHS_DONE:
                        next_rollout_phase = NORMAL;
                        next_cstate = CS_TO_PENDING;
                        break;
                break;
        break;
case Cl_OF_retn_PEND:
        switch (req_in)
        case CUPDATE, PEND_VALID:
        case CREAD
                next_cstate = Cl_TO_TV_back_PEND;
                next_cback = req_ptr;
                nullify = FALSE;
                break;
        case CPURGE, FRESH_INVALID)
                next_cstate = Cl_TO_PENDING;
                nullify = FALSE;
                break;
        break;
default:
        nullify = TRUE;
        break;
```

FIG. 6A

```
// inc_update response state machine
// uses the previous state of the responder to determine
// the next state of our cache
switch (cstate) {
case CS_PENDING:
        switch (resp_mstate) {
        if (resp_nullified)
            eri_retry() ;
    else {
        case MS_HOME:
                mac_write(CS_ONLY_DIRTY,NULL,NULL,data) ;
                free_eri_entry() ;
                break;
        case MS_FRESH:
                eri_write(CS_QUEUED_DIRTY,resp_forw,NULL) ;
                break;
        case MS_GONE:
                eri_write(CS_QUEUED_JUNK,resp_forw,NULL) ;
                break;
        default:
                error() ;
                break;
        }
    }
    break;
case CS_QUEUED_DIRTY:
    if (resp_nullified)
        eri_retry() ;
    else {
        switch (resp_cstate) {
        case CS_ONLY_FRESH:
        case CS_HEAD_FRESH:
        case CS_OF_retn_IN:
        caseCI_OF_retn_PEND:
                eri_write(CI_HD_UPDATE_HD,forw,NULL) ;
                break;
        case CS_HX_retn_IN:
                eri_write(CS_QUEUED_DIRTY,resp_forw,NULL) ;
        default:
                error() ;
                break;
        }
    }
    break;
```

FIG. 6B

```
case CS_QUEUED_JUNK:
    if (resp_nullified)
            eri_retry() ;
    else {
            switch (resp_cstate)
            case CS_ONLY_DIRTY:
            case CS_HEAD_DIRTY:
            case CS_OD_spin_IN:
                eri_write(CI_HD_UPDATE_HD,forw,NULL) ;
                break;
            case CS_HX_retn_IN:
                eri_write(CS_QUEUED_JUNK,resp_forw,NULL) ;
                break;
            default:
                error() :
                break;
            }
    }
    break;
case CI_HD_UPDATE_HD:
    if (resp_nullified)
            eri_retry() ;
    else {
            switch (resp_cstate) {
            case CS_TAIL_VALID:
            case CS_TV_back_IN:
            case CI_TV_back_PEND:
                mac_write(CS_HEAD_DIRTY_forw,NULL) ;
                free eri_entry() ;
                break;
            case CS_MID_VALID:
            case CS_MV_back_IN:
            case CS_MV_forw_MV:
                eri_write(CI_HD_UPDATE_HD,resp_forw,NULL) ;
                break;
            default:
                error() :
                break;
            }
    }
    break;
case CS_OF_MODS_OD:
    if (resp_nullified)
            eri_write(CS_OF_retn_PEND,NULL,NULL) ;
    else {
            switch (resp_mstate) {
```

```
            case MS_FRESH:
                    mac_write(CS_ONLY_DIRTY,NULL,NULL) ;
                    free_eri_entry() ;
                    break;
            default:
                    error() :
                    break;
            }
        }
        break;
    case CS_HF_MODS_HD:
        if (resp_nullified)
            eri_write(CI_HF_FORW_HX_forw,NULL) ;
        else {
            switch (resp_mstate) {
            case MS_FRESH:
                    eri_write(CI_HD_UPDATE_HD,forw,NULL) ;
                    break;
            default:
                    error() :
                    break;
            }
        }
        break;
    case CS_HX_retn_IN:
        if (resp_nullified)
            eri_retry() ;
        else {
            switch (resp_mstate) {
            case MS_FRESH:
            case MS_GONE:
                    eri_write(CS_PENDING,NULL,NULL) ;
                    else
            default:
                    error() :
                    break;
            }
        }
        break;
    caseCI_OF_retn_PEND:
        if (resp_nullified)
            eri_retry() ;
        else {
            switch (resp_mstate) {
            case MS_FRESH:
                    eri_write(CS_PENDING,NULL,NULL) ;
            default:
                    error() :
                    break;
            }
        }
        break;
```

FIG. 6C

```
caseCI_TO_PENDING:
    eri_write(CS_PENDING,NULL,NULL) ;
    break;
case CI_TV_back_PEND:
    if (resp_nullified)
        eri_retry() ;
    else {
        switch (resp_cstate) {
        case CS_HEAD_DIRTY:
        case CS_HEAD_FRESH:
        case CS_MID_VALID:
        case CS_MV_forw_MV:
        case CI_HD_FORW_HX:
        case CI_HF_FORW_HX:
        case CS_HF_MODS_HD:
        case CS_HD_INVAL_OD:
        case CS_HX_INVAL_XX:
        case CI_HD_UPDATE_HD:
            eri_write(CS_PENDING,NULL,NULL) ;
            break;
        default:
            error() ;
            break;
        }
    }
    break;
case CS_MV_back_IN:
    if (resp_nullified)
        eri_retry() ;
    else {
        switch (resp_cstate) {
        case CS_HEAD_DIRTY:
        case CS_HEAD_FRESH:
        case CS_MID_VALID:
        case CS_MV_forw_MV:
        case CI_HD_FORW_HX:
        case CI_HF_FORW_HX:
        case CS_HF_MODS_HD:
        case CS_HD_INVAL_OD:
        case CS_HX_INVAL_XX:
        case CI_HD_UPDATE_HD:
            eri_write(CS_PENDING,NULL,NULL) ;
            break;
        default:
            error() ;
            break;
        }
    }
    break;
```

```
case CS_MV_forw_MV:
        if (resp_nullified)
                eri_retry() ;
        else {
                switch (resp_cstate) {
                case CS_MID_VALID:
                case CS_TAIL_VALID:
                        eri_write(CS_MV_back_IN,NULL,back) ;
                        break;
                default:
                        error() ;
                        break;
                }
        }
        break;
case CI_HF_FORW_HX:
        if (resp_nullified)
                eri_retry() ;
        else {
                switch (resp_cstate) {
                case CS_MID_VALID:
                case CS_TAIL_VALID:
                        eri_write(CS_HX_retn_IN,NULL,NULL) ;
                        break;
                default:
                        error() ;
                        break;
                }
        }
        break;
case CI_HF_FORW_OF:
        eri_write(CI_OF_retn_PEND,NULL,NULL) ;
        break;
case CS_TV_back_IN:
        if (resp_nullified)
                eri_retry() ;
        else {
                switch (resp_cstate) {
                case CS_HEAD_DIRTY:
                case CS_HEAD_FRESH:
                case CS_MID_VALID:
                case CS_MV_forw_MV:
                case CI_HD_FORW_HX:
                case CI_HF_FORW_HX:
                case CS_HF_MODS_HD:
                case CS_HD_INVAL_OD:
                case CS_HX_INVAL_XX:
                case CI_HD_UPDATE_HD:
```

FIG. 6F

```
                mac_write(ER1_CS_INVALID,NULL,NULL) ;
                free_eri_entry() ;
                break;
            default:
                error() ;
                break;
            }
        }
        break;
    case CS_TO_INVALID:
        mac_write(CS_PENDING,NULL,NULL) ;
        free_eri_entry() ;
        break;
    case CI_TO_TV_back_IN:
        eri_write(CS_TV_back_IN,forw,back) ;
        break;
    case CI_TO_TV_back_PEND:
        eri_write(CI_TV_back_PEND,forw,back) ;
        break;
    }
```

FIG. 7A

| Cache State | Cache Command | ptr = id? | New State | forw ptr | back ptr | Status | Notes |
|---|---|---|---|---|---|---|---|
| CS_INVALID | CC_CINC | X | | | | nullify | |
| CS_ONLY_FRESH | CC_CINC | X | error | | | nullify | |
| CS_ONLY_DIRTY | CC_CINC | X | error | | | nullify | |
| CS_HEAD_FRESH | CC_CINC | X | error | | | nullify | |
| CS_HEAD_DIRTY | CC_CINC | X | error | | | nullify | |
| CS_MID_VALID | CC_CINC | X | | | | OK | |
| CS_TAIL_VALID | CC_CINC | X | | | | OK | |

FIG. 7B

| Cache State | Cache Command | ptr = id? | New State | forw ptr | back ptr | Status | Notes |
|---|---|---|---|---|---|---|---|
| CS_PENDING | CC_CINC | X | | | | nullify | |
| CS_HX_INVAL_XX | CC_CINC | X | | | | nullify | |
| CS_HD_INVAL_OD | CC_CINC | X | | | | nullify | |
| CS_MV_back_IN | CC_CINC | X | | | | OK | |
| CS_MV_forw_MV | CC_CINC | X | | | | OK | |
| CS_OD_RETN_IN | CC_CINC | X | | | | nullify | |
| CS_OD_spin_IN | CC_CINC | X | | | | nullify | |
| CS_OF_MODS_OD | CC_CINC | X | | | | nullify | |
| CS_HF_MODS_HD | CC_CINC | X | | | | nullify | |
| CS_OF_retn_IN | CC_CINC | X | | | | nullify | |
| CI_OF_retn_PEND | CC_CINC | X | | | | nullify | |
| CS_QUEUED_DIRTY | CC_CINC | X | | | | nullify | |
| CS_QUEUED_FRESH | CC_CINC | X | | | | nullify | |
| CS_QUEUED_JUNK | CC_CINC | X | | | | nullify | |
| CS_QUEUED_HOME | CC_CINC | X | | | | nullify | |
| CS_TO_INVALID | CC_CINC | X | | | | nullify | |
| CS_TO_PENDING | CC_CINC | X | | | | nullify | |
| CS_TV_back_IN | CC_CINC | X | | | | OK | |
| CS_TV_back_PEND | CC_CINC | X | | | | OK | |
| CS_OF_FLUSH_IN | CC_CINC | X | | | | nullify | |
| CI_HF_FORW_HX | CC_CINC | X | | | | nullify | |
| CI_HF_FORW_OF | CC_CINC | X | | | | nullify | |
| CI_HD_FORW_HX | CC_CINC | X | | | | nullify | |
| CI_HD_FORW_OD | CC_CINC | X | | | | nullify | |
| CI_HX_retn_IN | CC_CINC | X | | | | nullify | |
| CI_HD_UPDATE_HD | CC_CINC | X | | | | nullify | |

NC update Fix

| state | encoding | behavior |
|---|---|---|
| normal | 00 | nullify cinc, change phase |
| wait_resp | 01 | nullify cinc |
| corr_phase_done | 10 | allow cinc |
| corr_phase | 11 | allow cinc |

·······▶ INCREMENT REQUEST
───▶ ROLLOUT RESPONSE

INCREMENT UPDATE IN AN SCI BASED SYSTEM

BACKGROUND OF THE INTENTION

The Scaleable Coherent Interface (SCI) standard for updating cache lines is essentially an invalidate flow, wherein only one cache can have a copy of the line, and this is the copy that will be updated or written, and all other caches must be purged before the write can commence.

A barrier is a mechanism used in parallel processing which will synchronize all processors and/or threads at that point in the code. It is very desirable in parallel processing to have a fast barrier. The faster the barrier, the less time that must be spent on synchronizing, and the more time for performing real work. So a faster barrier allows finer grained parallelism in the system operations. Barriers generally consist of a join and release. The join operation is not covered here because that is generally a fetch and increment instruction. A barrier release is one of the applications that would use write commands involving many nodes trying to read and receive a new value.

FIGS. 1A–C depict a simple SCI sharing list 100 and the actions that are required to actually update or write a value in that list. This assumes that all the nodes that are in the sharing list want to see the new value. In this case, the list 100 has the memory 101, which is marked GONE, meaning that the data in memory is obsolete. The memory includes a pointer that is pointing to node 0 102. The memory pointer is always pointing to the head of the sharing list 100. Thus, as shown in FIG. 1A, node 0 102 is currently the head.

In this case, node 0 102 is marked head_dirty, which means that even though the line is shared, node 0 is responsible for returning the data to memory if the sharing list is collasped. Node 0 102, or the head, has a forward pointer that points to node 1 103, which is a mid_valid. Node 1 103 has a forward pointer that points to node 2 104, and node 1 103 also a back pointer which points back to node 0 102. Node 2 104 is a tail_valid in FIG. 1A, and it has a back pointer to node 1 103.

If node 0 102 wants to increment the value in the line that is shared by the sharing list 100, it must first send a VALID_INVALID request to node 1 103. Node 0 102 then receives the forward pointer from the node 1 103, the mid_valid node. Node 0 102 uses that forward pointer then to send an invalid request, VALID_INVALID to node 2 104. The state received back from node 2 104 is tail, which means that the end of the list has been reached. At that point, node 0 102 is now the only one in the sharing list, and since the list is a dirty list, it can therefore increment the value.

In the meantime, both node 1 103 and node 2 104 are reading the line to see the new value. To read, the nodes must go back to memory 101 and rejoin the sharing list 100. When node 1 103 sends a read request to memory 101, it sees that the line is gone, so memory 101 updates the line to point to node 1 103. Node 1 103 then receives a pointer to node 0 102, which has the only copy of the line. Node 2 104 also sends a read request to memory 101 to rejoin the list. It sees that the memory 101 is gone and that it points to node 1 103 and therefore it has to go to node 1 103 for a new copy of the line. Memory 101 updates its pointer to node 2 104 and then the forward pointer of node 2 104 is changned to node 1 103.

FIG. 1B depicts the state of the cache of the SCI sharing list 100 at the point where the memory 101 is marked GONE and is pointing to node 2 104. Node 2 104 is essentially queued and it is marked queued_junk, because the data in the line is not valid. Node 2 104 points to node 1 103, which is also marked queued_junk, and node 1 103 points to node 0 102, which has the only valid copy of the line. Thus, at this point node 1 103 sends a cache read request, CREAD, to node 0 102, and receives the new version of the line. Meanwhile, node 2 104 is sending a cache read request to node 1 103. When node 1 103 receives the new value, it will pass the new value to node 2 104, when it receives the next timely request from node 2 104.

FIG. 1C depicts the final state of the sharing list 100. In this case, the memory 101 is marked GONE, and is pointing to node 2 104, which is now marked head, and has valid data. The head, node 2 104, is pointing to node 1 103, which is the mid and has valid data. The mid, node 1 103, is pointing to node 0 102, which was the original writer, and is now the tail.

The main problem with the system and method shown in FIG. 1 is that the sharing list has to be completely disassembled and then rebuilt. This process takes a great deal of system time and resources that otherwise would be available for other transactions.

SUMMARY OF THE INVENTION

This problem and other problems are solved by a system and method which uses an increment update flow as an enhancement over the standard SCI data flows, which increments a word in all caches in an SCI sharing list, in order to significantly speed up a barrier release. The processor/node that is executing the increment update must first become the head of the sharing list just like a read private flow. At this point the node then traverses the sharing list and increments a word in each cache. The state and pointers return from each cache allowing the head processor to continue down the list.

Special care must be taken if a node attempts to roll out of the sharing list while the head is traversing the list. In this case, additional states are used to prevent the list from becoming corrupted. Even though this method is described only for an increment update flow version, this method could also work for a full write update operation.

A technical advantage of the present invention is to issue an update command from the head node in the sharing list to the remaining nodes while maintaining the position of the head node in the sharing list.

Another technical advantage of the present invention is to have the head node issue an increment command to each successive node in the list until the end of the list is reached. As each node receives the increment command, it updates its cache and then sends a reply back to the first node.

A further technical advantage of the present invention is to prevent a node from rolling out of the sharing list before that node receives the update command. Each node has a phase value that is toggled as the node is incremented. Thus, a rollout request will be nullified unless the phase value of the rollout request matches the phase value of the node.

A further technical advantage of the present invention is to provide an interlock to inhibit a node that is being rolled out from being incremented until it has issued a rollout request with the correct phase.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B depict the inventive method for updating a SCI sharing list;

FIG. 3 depicts the pseudo code that describes the table initialization state machine in the SCI controller for implementing the inventive increment update method;

FIG. 4 depicts the pseudo code that describes the request state machine in the SCI controller for implementing the inventive increment update method;

FIGS. 5A to 5E depict the pseudo code that describes the conflicting request state machine in the SCI controller for implementing the inventive increment update method;

FIGS. 6A to 6F depict the pseudo code that describes the response state machine in the SCI controller for implementing the inventive increment update method;

FIGS. 7A and 7B depict the various cache state transitions;

DESCRIPTION OF THE PREFERRED EMBODIMENTS

Figure 1A:
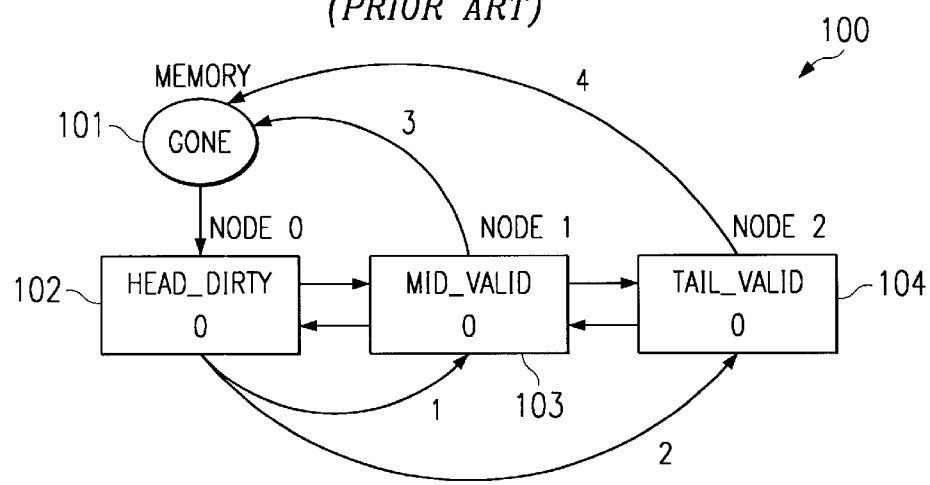
FIGS. 1A, 1B and 1C depict the steps to update a SCI sharing list using a standard SCI operations.

FIGS. 2A and 2B depict the inventive increment update flow process on the simple SCI sharing list shown in FIG. 1A. In FIG. 2A, again, like FIG. 1A, shows a sharing list 100 with the memory 101 marked gone, and the memory 101 is pointing to node 0 102. Node 0 102 is in the head_dirty state and is pointing to node 1 103. Node 1 103, which is mid_valid and is pointing to node 2 104, which is tail_valid.

In this case, node 0 101 wants to release a barrier with an increment update. Node 0 102 will send a coherent increment command, CINC, to node 1 103. Node 1 103 will increment its value, purge local processor caches (within the node) and send its state and pointer back to node 0 102. Node 0 102 then will receive this response from node 1 103, examine the state, and determine that it is mid_valid. Node 0 102 will then take the pointer and send a coherent increment command, CINC, to node 2 104, which is the tail_valid node. Node 2, on receiving that request, will increment its value in its cache, and then pass its tail_valid state back to node 0 102. Node 0 102, upon receiving the tail_valid, knows that the end of the sharing list 100 has been reached and thus is done. Node 0 102 then increments its own value and the increment update flow is complete. FIG. 2B shows that resulting sharing list 200 is unchanged except that the value has been incremented in each node.

Figure 1B:
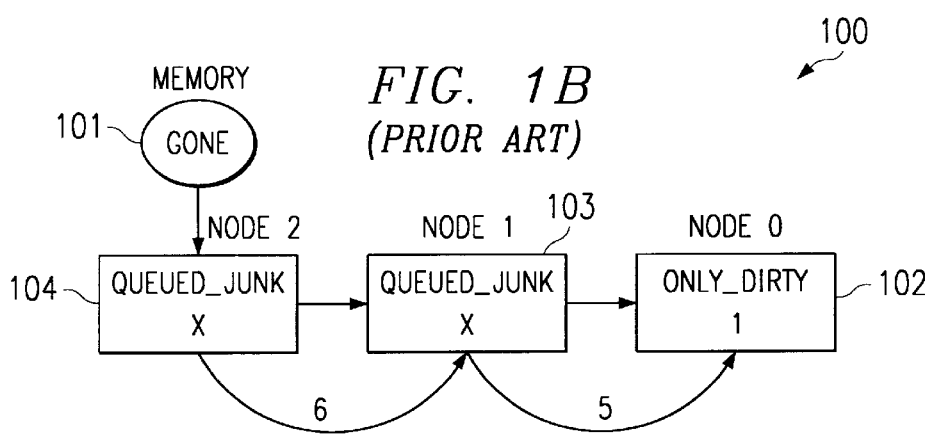
Figure 1C:
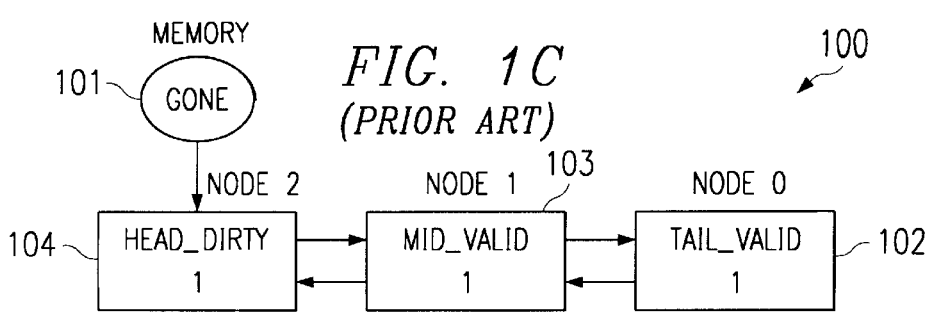

The system shown in FIG. 1 is compared to the system shown in FIG. 2 and reveals that each essentially depict the same process from a program's point-of-view, but the FIG. 1 system has significantly more traffic to achieve the same result as does the FIG. 2 system. FIG. 1 tears down the list and forces it to rebuild, while FIG. 2 essentially follows the list and increments as needed. The tearing down and rebuilding takes a significantly longer time and uses SCI resources that otherwise would be available for other transactions.

FIGS. 3A through 3C depict the pseudo code that describes the tasks of the various hardware state machines in the SCI controller that are used to implement the inventive increment update process. FIG. 3 describes the operations when the memory access controller (MAC) sends a request to the SCI controller (or TAC). FIG. 4 describes for each state what request to make to the SCI rings. FIGS. 5A–5E explain what happens to a response in a given state and what to do next, i.e. make another request to the SCI ring, make a response to the MAC, or do both. FIGS. 6A–6F describe the response state machine.

FIG. 3 is the code that explains the task of the MAC request state machine. In this code, there is a case statement for each one of the possible states that the MAC could send to the TAC (or SCI controller) for increment update requests. In this case, the SCI write subroutine is essentially a ring request. So in the first case where there is an increment update to CS_invalid, then a ring request would be sent with the state being pending.

Another example would be where increment update is performed with a head_dirty. In that case, the state is changed to the head_dirty_update head_dirty and a ring request would be sent. The exact ring request for each of the states is then described in FIG. 4. In this figure, if the state was the state_of_pending, a ring request would be made of a memory read with the sub-opcode of cache dirty, which means the current contents of memory are read and then marked gone so that it can be written.

FIGS. 5A–5E depict a conflicting request state machine. What this means is that while a particular TAC is doing an increment update flow, it can receive requests for the same line from other nodes that are doing other flows. FIGS. 5A–5E describe what state transitions are made when requests are received from other nodes. For example, if in the mid_valid_back_in state, which means rolling out of a mid_valid state and trying to get to the head before beginning the increment update part of the flow, a CPURGE, another CINC, or any other ones could be received. All other ones that are not listed here are automatically nullified. The states that are listed here will perform the stated transition. In this case, with the mid_valid_back_in, if a CPURGE request is received, then the state will be changed to to_invalid, which means that when the response to the current request is received you can go to an INVALID state.

FIGS. 6A–6F depict the response state machine. This is the state machine that will take a response to the request and the current state and then determine what to do next. For example, if state was pending and a non-nullified response of home is received, which means that the line was unused and there is no sharing list, then one can immediately go to the only_dirty state and finish the flow.

FIG. 7A shows a table of the cache transitions made when increment requests are received while in the SCI stable states of invalid only_fresh, only dirty, etc.

FIG. 7B shows a table of the cache transitions made when increment requests are received while in the SCI transitory states. This is a simplified table version of FIGS. 5A–5E. The table lists the current cache state, the incoming cache command, and whether the proper local pointer is equal to the requester's node ID. It also explains what the new state will be and whether the response is nullified. The one of the most important of the types of the requests are coherent increment (CINC) requests. For example, if a CINC request is received to a line that is only_fresh, then this is an error, because this should never happen. Another example would be a CINC request to a mid_valid. In this case, the shared phase will be toggled, the cache line incremented, and the state will remain mid_valid.

Two significant problems had to be solved for increment update to work in all cases. One problem is that a node can rollout of a sharing list just before it receives the cache increment command. At this point, the next pointer is lost and the sharing list appears to be broken to the head. The solution was the introduction of a concept of shared phase.

All sharing states: head_dirty, head_fresh, etc., have a phase 0 or 1. All nodes in the static sharing list have the same phase for the line. As the head increments each node in the list, the phase is toggled. A pre_vtail or pre_vmid rollout request is nullified until the shared phase in the request packet and therefore, the shared phase of the requester, matches the local shared phase for that line. For this to be true, the head must have incremented both nodes involved in the rollout and therefore, the rollout is safe.

An example of this in the process as shown in FIGS. 5A–5E. In this case, if a particular line is in the mid_valid forward mid_valid state and a CUPDATE pre_vmid is received from the next mid_valid in the sharing list, the local node ensures that both the request came from the node it is pointed to by the forward pointer and that the shared phases are equal before allowing the pre_vmid command to complete.

The second major problem is that the shared phase used to solve the first problem did not solve all cases of rollout conflicts. In some cases, rollout requests can take a long time to reach the target such that the list can be in process of being incremented a second time before the target is reached. And since the shared phase only has two values, the new value of the target is equal to the original value. The rollout request reaches its destination after the second increment, but before the node that is rolling out is incremented the second time. This rollout is allowed to complete and the head now has an invalid pointer.

The solution was to put an interlock in rollouts. A node that is in the process of rolling out of a sharing list is not allowed to be incremented until a rollout request with the current phase has been made. This is achieved by nullifying the incoming increment request until the proper rollout request is made. The state needed for this is depicted in FIG. 8. The request referred to by this state machine is the coherent increment request or CINC request. The response referred to by this state machine is the response to the pre_vmid or pre_vtail rollout requests.

Figures 8A, 8B:
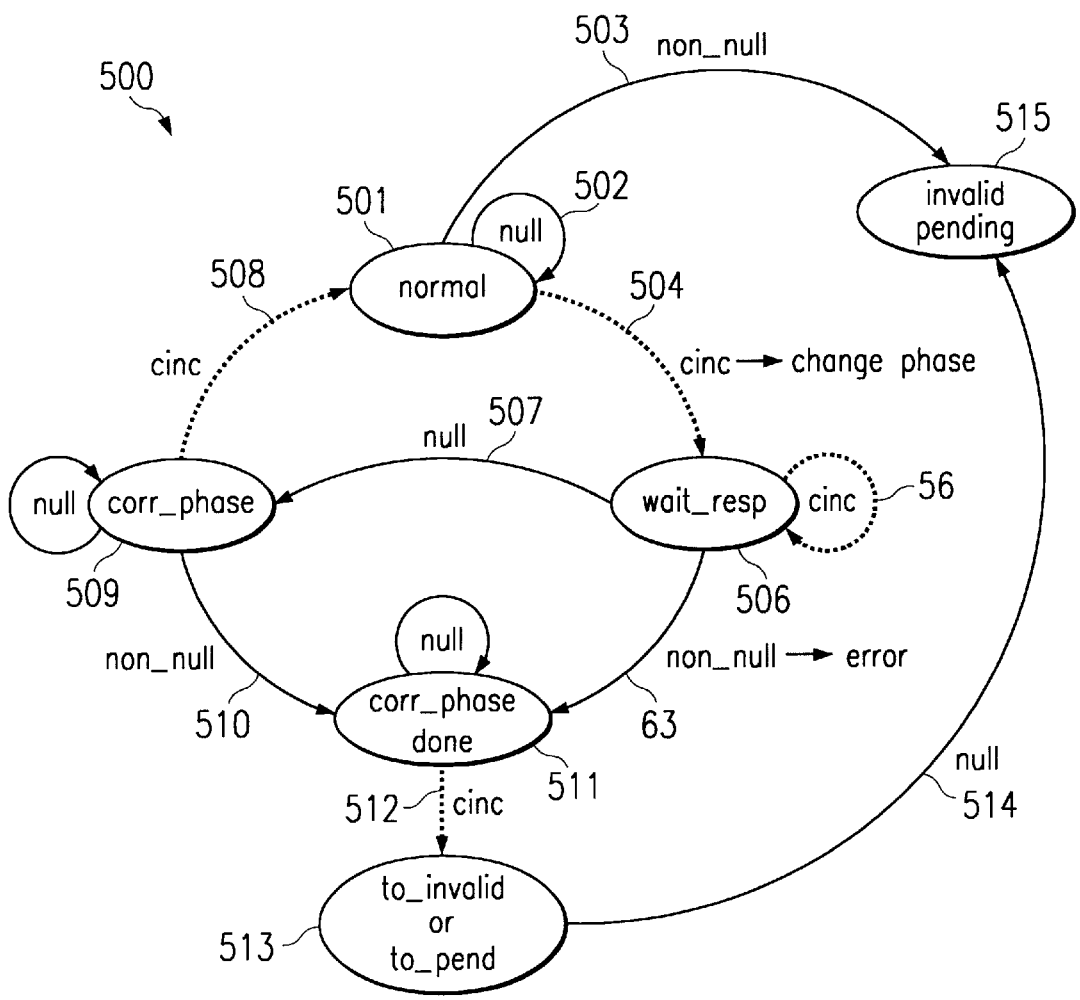
FIG. 8A depicts a state diagram with the resulting behavior for cache lines in mv_back_in or tv_back_in states.
FIG. 8B depicts the flow states that a cache line that is a mv_back_in or a tv_back_in move through when an increment request is received from the current head of the sharing list.

FIG. 8A depicts a state diagram with the resulting behavior for cache lines in mid_valid or tail_valid back_in states. FIG. 8B depicts the flow states that a cache line that is a mid_valid or tail_valid back_in move through when an increment request is received from the current head of the sharing list. As a line enters the mid_valid back_in or tail_valid_back_in state it is in the normal state 501 in this state machine 500. If a response is received to the request while in the normal state 501, and the response is not nullified 503, then the flow could not be in the middle of coherent increment update. The response is then just completed normally.

If the response is nullified 502, this means that the flow could be doing an increment update, and thus requires a new request and waiting for the coherent increment or a non-nullified response to our last request. When in the normal state 501 and a coherent increment update request is received from the head of the sharing list 504, the local state transitions to wait response state 506. Going into the wait response 506 also changes the shared phase of the flow. In the wait response 506, the flow will continue to nullify coherent increment updates and wait for a response. When a nullified response 507 is received, the flow will then switch to the correct phase state 509, and then make a new request 508 with the corrected phase.

At this point if a new coherent increment is received, the flow can then go to the normal state 501 and wait for a non-nullified response 503. While in the correct phase state 509, the flow may receive a non-nullified response 510 before getting a new coherent increment request. In that case, the flow moves to the correct phase done state 511 and then remains in that state, and waits for the coherent increment update 512 to reach state 513. Nullify responses such as 502 specify that a request to the node that is pointed to by a back pointer nullified the rollout request and therefore this node must make a new request. Non-nullified responses such as 503 mean that the request was successful. States 501, 506, 509, and 511 are substates of the mv_back_in or tv_back_in SCI states.

State 513 is a result of the receipt of a coherent increment while in the correct_phase_done state. Then the SCI state is transitioned from the mid_valid_back_in or tail_valid_back_in state to the state of to_invalid or to_pending 513. In this case, the flow is waiting for a response from the cupdate pre_vmid request made to the node that was pointed to by the back_pointer. When the flow receives that response, the flow then moves 514 to the invalid or pending state 515. This means that either the flow is done, which is the invalid state, or that the flow is ready to begin the next part of the flow, which is the pending state. The to_invalid 513 and the invalid 515 states are standard SCI states.

For each of the different states of the state machines, incoming coherent increment requests are handled differently. If in the normal state, a coherent increment request will be nullified and the shared_phase will be toggled. If in the wait response state, the coherent increment will be nullified. If in the correct_phase_done or correct_phase states, the coherent increment will receive a normal response.

An example of how this state machine is used is shown in FIGS. 5A–5E. In the case of mid_valid_back_in, one can see that if a coherent increment request is received, then the states will be changed as in the state diagram. For example, in the normal state, the shared phase will be toggled and a nullified response will be sent when a CINC request is received. If in normal state or wait response, one can also see how the rollout phase changes according to the state diagram.

FIGS. 5A–5E just shows the transitions made from the coherent increment requests. The transitions made from the responses are another documentation. FIGS. 6A–6F the mid_valid_back_in and tail_valid_back_in states will show the state transitions made from the responses to the rollout requests, either nullified or non-nullified.

Figure 9:
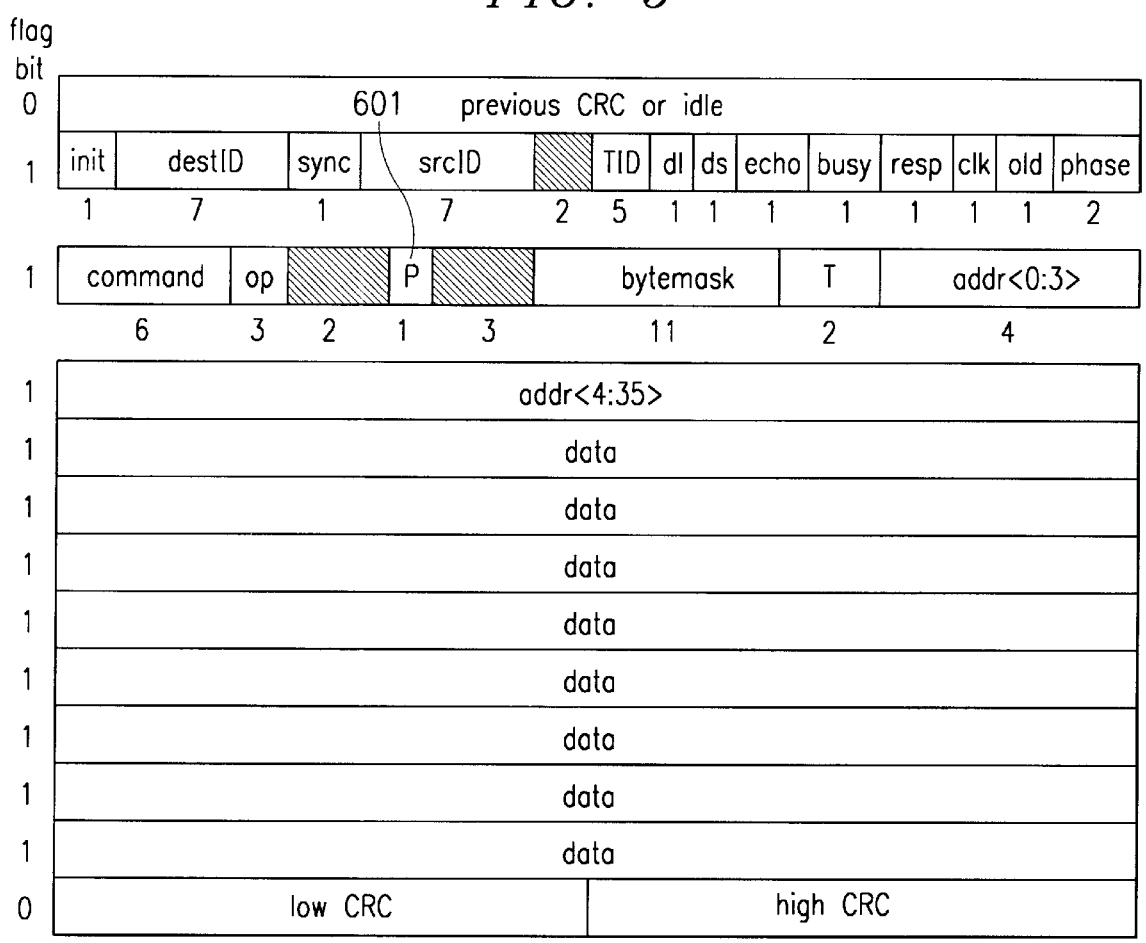
FIG. 9 depicts the shared phase bit marked with a P in a response packet.

FIG. 9 shows the shared phase bit 601 marked with a P in a send response packet 600. A similar bit is in a send request packet, which is not shown. On the request packet, the P bit 601 is sent along with the request so that it is known that the phase is the same, thus allowing the rollout to complete. On the response packet, the P bit 601 is used when building a list to initialize the correct state.

Although the present invention and its advantages have been described in detail, it should be understood that various changes, substitutions and alterations can be made herein without departing from the spirit and scope of the invention as defined by the appended claims.

What is claimed is:

1. A method for performing an update operation on a memory sharing list comprised of a plurality of nodes in a multi-node system, wherein the sharing list has a sequential arrangement of the nodes, wherein each node on the sharing list is storing in memory a copy of a memory data, the method comprising the steps of:

issuing an update command for the update operation from a first node in the sharing list to the remaining nodes in the sharing list;

using a data packet to distribute the command for the update operation throughout the system;

preventing a node of the plurality of nodes from rolling out of the sharing list before the node receives the update command; and maintaining the first node at a head position in the sharing list;

wherein the multi-node system is a SCI multi-node system, the memory is a cache, and the memory data is a memory line, and the step of preventing comprises the step of toggling a phase value of each node in the list as each node is incremented by the update command issued by the first node.

2. The method according to claim 1, wherein the step of issuing an update command comprises the step of:

issuing an increment command from the first node to the next node of the list.

3. The method according to claim 2, further comprises steps of: receiving, by a node of the plurality of nodes, the increment command from the first node; updating the memory of the node according to the increment command; and sending, by the node, a reply back to the first node.

4. The method according to claim 3, wherein the reply includes a state of node and a pointer to the subsequent node in the list, the method further comprises the steps of:

receiving, by the first node, the reply from the node; and determining from the pointer whether the node is the last node of the list.

5. The method according to claim 4, wherein the node is the last node of the list, the method further comprises the step of:

updating, by the first node, the memory of the first node according to the increment command.

6. The method according to claim 4, wherein the node is not the last node of the list, the method further comprises the step of:

issuing, by the first node, the increment command to the subsequent node;

receiving, by the subsequent node, the increment command from the first node;

updating the memory of the subsequent node according to the increment command;

sending, by the subsequent node, a reply back to the first node;

receiving, by the first node, the reply from the subsequent node; and determining whether the subsequent node is the last node of the list.

7. The method according to claim 1, further comprises the step of:

nullifying a rollout request if the phase value of the rollout request does not match the phase value of the node being requested to rollout.

8. The method according to claim 1, further comprises the step of:

rolling out a node if the phase value of the rollout request matches the phase value of the node.

9. The method according to claim 1, wherein the step of preventing comprises the step of:

interlocking rollout requests to inhibit a node that is being rolled out from being incremented.

10. The method according to claim 9, wherein the node has a normal state, wherein the step of interlocking rollout requests comprises the steps of:

nullifying the increment command;

changing a phase value of the node; and changing the state of the node from the normal state to a waiting response state.

11. The method according to claim 9, wherein the node has a normal state, wherein the step of interlocking rollout requests comprises:

receiving a non-nullified response; and changing the state of the node from the normal state to a pending state.

12. The method according to claim 9, wherein the node has a waiting response state, wherein the step of interlocking rollout requests comprises the steps of:

nullifying the increment command;

receiving a nullified response; and changing the state of the node from the waiting response state to a correct phase state.

13. The method according to claim 9, wherein the node has a correct phase state, wherein the step of interlocking rollout requests comprises the steps of:

receiving a nullified response;

issuing a new increment request; and changing the state of the node from the correct phase state to a normal state.

14. The method according to claim 9, wherein the node has a correct phase state, wherein the step of interlocking rollout requests comprises the steps:

receiving a non-nullified response; and changing the state of the node from the correct phase state to a correct phase done state.

15. The method according to claim 9, wherein the node has a correct phase done state, wherein the step of interlocking rollout requests comprises:

transitioning to a flow complete state.

16. A multi-node system that performs an update operation on a memory sharing list comprised of a plurality of nodes, wherein the sharing list has a sequential arrangement of the nodes, wherein each node on the sharing list is storing in memory a copy of a memory data, the system comprising:

means for issuing an update command for the update operation from a first node in the sharing list to the remaining nodes in the sharing list;

means for using a data packet to distribute the command for the update operation throughout the system;

means for preventing a node of the plurality of nodes from rolling out of the sharing list before the node receives the update command; and means for maintaining the first node at a head position in the sharing list;

wherein the system is a SCI multi-node system, the memory is a cache, and the memory data is a memory line, and the means for preventing further comprises means for toggling a phase value of each node in the list as each node is incremented by the update command issued by the first node.

17. The system according to claim 16, wherein the means for issuing an update command further comprises:

means for issuing an increment command from the first node to the next node of the list.

18. The system according to claim 16, further comprising:

means for nullifying a rollout request if the phase value of the rollout request does not match the phase value of the node being requested to rollout.

19. The system according to claim 16, further comprising:

means for rolling out a node if the phase value of the rollout request matches the phase value of the node.

20. The system according to claim 16, wherein the means for preventing further comprises:

means for interlocking rollout requests to inhibit a node that is being rolled out from being incremented.

21. The system according to claim 20, wherein the node has a normal state, wherein the means for interlocking rollout requests comprises:

means for nullifying the increment command;

means for changing a phase value of the node; and means for changing the state of the node from the normal state to a waiting response state.

22. The system according to claim 20, wherein the node has a normal state, wherein the means for interlocking rollout requests comprises:

means for receiving a non-nullified response; and means for changing the state of the node from the normal state to a pending state.

23. The system according to claim 20, wherein the node has a waiting response state, wherein the means for interlocking rollout requests comprises:

means for nullifying the increment command;

means for receiving a nullified response; and means for changing the state of the node from the waiting response state to a correct phase state.

24. The system according to claim 20, wherein the node has a correct phase state, wherein the means for interlocking rollout requests comprises:

means for receiving a nullified response;

means for issuing a new increment request; and means for changing the state of the node from the correct phase state to a normal state.

25. The system according to claim 20, wherein the node has a correct phase state, wherein the means for interlocking rollout requests comprises:

means for receiving a non-nullified response; and means for changing the state of the node from the correct phase state to a correct phase done state.

26. The system according to claim 20, wherein the node has a correct phase done state, wherein the means for interlocking rollout requests comprises:

means for transitioning to a flow complete state.

27. A method for performing an update operation on a sharing list comprised of a plurality of nodes in a SCI multi-node system, wherein the sharing list has a sequential arrangement of the nodes, wherein each node is storing in cache a copy of a memory line, the method comprising the steps of:

issuing an update command from a first node in the sharing list to the remaining nodes in the sharing list, including issuing an increment command from the first node to the next node of the list;

using a data packet to distribute the command for the update operation throughout the system;

receiving, by a node of the plurality of nodes, the increment command from the first node;

updating the cache of the node according to the increment command;

sending, by the node, a reply back to the first node;

preventing a node of the plurality of nodes from rolling out of the sharing list before the node receives the update command; and maintaining the first node at a head position in the sharing list;

wherein the step of preventing comprises the step of toggling a phase value of each node in the list as each node is incremented by the update command issued by the first node.

28. A SCI multi-node system that performs an update operation on a sharing list comprised of a plurality of nodes, wherein the sharing list has a sequential arrangement of the nodes, wherein each node is storing in cache a copy of a memory line, the system comprising:

means for issuing an update command from a first node in the sharing list to the remaining nodes in the sharing list, including means for issuing an increment command from the first node to the next node of the list;

means for receiving, by a node of the plurality of nodes, the increment command from the first node;

means for updating the cache of the node according to the increment command;

sending, by the node, a reply back to the first node;

means for preventing a node of the plurality of nodes from rolling out of the sharing list before the node receives the update command; and means for maintaining the first node at a head position in the sharing list;

wherein the means for preventing further comprises means for toggling a phase value of each node in the list as each node is incremented by the update command issued by the first node.

* * * * *